Patented Oct. 6, 1936

2,056,612

UNITED STATES PATENT OFFICE 2,056,612

METHOD FOR THE RECOVERY OF ARALKYL ETHERS OF CELLULOSE

Eugene J. Lorand, Wilmington, Del., assignor to Hercules Powder Company, Wilmington, Del., a corporation of Delaware No Drawing. Application August 30, 1934
Serial No. 742,154

11 Claims. (Cl. 260—152)

This invention relates to a method for the recovery of aralkyl ethers of cellulose from the crude reaction mixture in which they are formed.

Aralkyl ethers of cellulose, such as, for example, benzyl cellulose, phenylethyl cellulose, etc., are formed by the action of an aralkylating agent, usually an aralkyl halide, on an intimate admixture of cellulose and aqueous alkali, a material commonly referred to as alkali cellulose. At the conclusion of the reaction resulting in the formation of the aralkyl ether of cellulose the cellulose ether remains admixed with by-products and excess reagents. This admixture or reaction mass is a pasty, gummy mass comprising, in addition to the cellulose ether, sodium chloride (or other halide), sodium hydroxide, aralkyl halides, aralkyl ethers, polymerized aralkyl compounds of high molecular weight, etc. The recovery of the aralkyl ether of cellulose in substantially pure form from this reaction mass has always presented a difficult problem to the art.

Certain procedures for the recovery or purification methods heretofore known have involved the treatment of the reaction mass with an organic liquid which would dissolve the organic impurities present but not the aralkyl ether of cellulose. By such treatment the aralkyl ether of cellulose is "precipitated", and the precipitate is then washed further with such organic liquids to complete the purification. The precipitate is finally washed with water to remove all the inorganic impurities present and is then ready for use.

Despite the apparent simplicity of this procedure, it presents extraordinary difficulties. Unless the precipitated aralkyl ether of cellulose is granular, firm and porous in form, the complete removal of impurities therefrom is nearly impossible. The usual organic liquids used as "precipitants", such as, for example, gasoline, petroleum ether, methyl alcohol, ethyl alcohol, etc., tend to effect separation of the aralkyl ether of cellulose in a rather gummy, non-porous mass that is extremely difficult to purify further.

Now in accordance with this invention it has been found that certain organic liquids, not heretofore utilized, should be used to insure precipitation of the aralkyl ethers of cellulose in a form suitable for further purification, and that such liquids are characterized by certain properties which will be hereinafter described.

A study of the physical changes produced in the crude reaction mixture upon the introduction of various organic liquids, precipitants for aralkyl ethers of cellulose, has shown me that first a mere dilution of the reaction mass occurs with a consequent increase in fluidity. Upon continued addition of precipitant, however, a marked change takes place and the mass separates into two distinct layers. The lower layer is viscous and contains most of the aralkyl ether of cellulose; the upper layer is fluid and contains most of the precipitant. While this phenomenon of separation occurs with all the various organic solvents, non-solvent of aralkyl ethers of cellulose, known to me, it nevertheless requires a different ratio of organic liquid to reaction mixture for the different liquids. This ratio of organic liquid to reaction mixture necessary for separation of the mass into two layers I have termed the "separation ratio." Certain organic liquids, as, for example, petroleum hydrocarbons, the lower aliphatic alcohols, etc., need be added only in relatively small quantity to produce separation, i. e., they have a low "separation ratio." Other organic liquids, as, for example, aliphatic ethers, higher aliphatic alcohols (4 or more carbon atoms), etc., must be added in relatively large quantity to produce separation, i. e., they have a high "separation ratio."

Upon further continued addition of any one of the organic liquids, or precipitants, to the mixture after separation has taken place, the lower layer containing the aralkyl ether of cellulose becomes more viscous, and finally breaks up (upon agitation) into a distinct precipitate. The ratio of additional precipitant required to produce this break-up also varies with the precipitant, not, however, in line with the "separation ratio." Thus, relatively large additional quantities of hydrocarbon solvents and of the lower aliphatic alcohols are required to produce the break-up of the cellulose ether. These materials accordingly have a high "break-up ratio." On the other hand, the aliphatic ethers and higher aliphatic alcohols need only be added in relatively small additional amount to produce the break-up effect, and so have a low "break-up ratio".

I have further found in accordance with this invention that, except under unusual conditions, those precipitants having a low "separation ratio" and/or a high "break-up ratio", cause the precipitation of the aralkyl ethers of cellulose in the form of gummy, non-porous granules which cannot readily be further purified. On the contrary, those precipitants having a high "separation ratio" and a low "break-up ratio", which precipitants have not heretofore been used in the recovery of aralkyl ethers of cellulose, under all normal conditions of precipitation produce a hard, porous, granular precipitate of aralkyl ethers of cellulose which, because of its form can be further purified completely and easily.

The "separation ratio" and the "break-up ratio" vary for each particular precipitant with the cellulose aralkyl ether content of the reaction mixture. However, with a reaction mixture containing about 15–18% aralkyl ether of cellulose a precipitant should desirably be used having a "separation ratio" of at least 2:3 (precipitant to reaction mixture) by volume, and a "break-up ratio" not substantially more than 1:1 (additional precipitant to original reaction mixture) by volume. I accordingly use the terms "high" and "low" as defining ratios in excess of or below these critical values, respectively.

The method in accordance with my invention comprises, therefore, the precipitation of aralkyl ethers of cellulose from a crude reaction mixture containing the same with an organic liquid which is solvent for the impurities contained in the reaction mass and a non-solvent for the aralkyl ether of cellulose, and which has a high "separation ratio" and a low "break-up ratio" as defined above, such as, for example, aliphatic ethers, as ethyl ether, isopropyl ether, amyl ether, etc.; aliphatic alcohols with 4 or more carbon atoms, as, for example, the butanols, as, n-butanol, isobutanol, secondary butyl alcohol, tertiary butyl alcohol, the pentanols, etc. In addition to the above-mentioned liquids, various mixtures of liquids, which themselves do not have the proper separation or break-up ratios, do possess the necessary requirements and may be used. Thus, for example, mixtures of aliphatic hydrocarbons, as petroleum ether, and methanol, ethanol, propanol, or isopropanol are satisfactory precipitants, although none of the individual liquids is. Such mixtures may contain the liquids in any proportions in which they are miscible.

The precipitant will, of course, be added in amount sufficient to produce the break-up and precipitation of the aralkyl ether of cellulose, an amount which varies with the particular precipitant employed. The addition may be made all at once or in several portions. Desirably the reaction mass will be thoroughly agitated during the precipitation. Such agitation may best be effected by an agitator of the type of a dough mixer or dynamite mixer while the mass is viscous, but may be effected very well with a propeller type agitator after the mass has been thinned by the added precipitant.

A very effective precipitation procedure comprises the addition of sufficient precipitant to thin the reaction mixture but not to effect separation into layers and the subsequent admixture of this thinned material with a comparatively large excess of precipitant. This procedure is described in more detail and is specifically claimed in my copending application, Serial No. 747,209, filed October 6, 1934.

The precipitated aralkyl ether of cellulose will be found to be uniformly granular, firm and porous in form. It is purified by being washed successively with more precipitant, methanol or ethanol, and water.

The following examples are illustrative of practical procedure in accordance with my invention:

*Example 1.*—250 g. of a reaction mixture from a completed benzylation containing about 15–18% benzyl cellulose are mixed in a small dynamite-type mixer with 500–600 cc. isopropyl ether. The latter may be added all at once or in two or more portions. The reaction mass is preferably cooled to room temperature or below, but this is not absolutely necessary if provision is made for the condensation of the evaporating precipitant. A precipitate of uniformly small granularity is obtained, which, after decantation of the liquid, is stirred up with 200 cc. fresh isopropyl ether. Two or three more washes with the precipitant, 150–200 cc. each time, hardens the porous precipitate sufficiently. The precipitate is then filtered, and the adhering isopropyl ether is removed by drying or distillation (e. g. with steam). The product is washed with water to remove the salt and excess alkali; it may be then extracted with methanol, if desired.

*Example 2.*—600 g. of a benzylation mass containing about 16–18% benzyl cellulose are mixed with 1000–1200 cc. diamyl ether in a Werner & Pfleiderer mixer. The precipitant is preferably worked into the mass at first in small portions; later, larger amounts may be added. However, it is possible to add the whole amount at once. The precipitate obtained is washed 3–4 times with fresh precipitant, then with methanol, and finally with water.

*Example 3.*—400 g. of the same benzylation mass as in Example 2 and 1200 cc. methyl tertiary-amyl ether are mixed in an efficient agitator in which horizontal bars pass each other with small clearance. A small granular or fine powdery precipitate is obtained, which is washed with the precipitant, and, after filtration, with ethanol and water successively.

*Example 4.*—200 g. of a benzylation-mixture containing 17–18% benzyl cellulose and, preferably, less than 4% water are vigorously agitated with 600 cc. of a 50:50 (by volume) methanol-commercial hexane mixture. The precipitate, after decantation is washed three times with the same mixture, then with methanol alone, and finally with water.

*Example 5.*—200 g. of the same reaction mass as used in the previous example and 500 cc. of a 40:60 (by volume) mixture of anhydrous industrial ethyl alcohol and commercial heptane are stirred in a suitable mixer. The precipitate is further treated as in the previous example, methanol being replaced by ethanol.

*Example 6.*—500 g. of the same benzylation mixture as in Examples 4 and 5 are treated, in a Werner & Pfleiderer mixer, with 1500 cc. of a 60:40 mixture (by volume) of isopropanol and a petroleum naphtha having a boiling range of 80–120° C. The precipitate, after decantation, is washed with isopropanol and, subsequently, with water.

*Example 7.*—300 g. of a benzylation mass containing about 50 g. benzyl cellulose is mixed in a small dynamite-type mixer with 700–800 cc. n-butanol. The fine, sandy precipitate is washed 3–4 times with butanol by decantation, then with water to remove the salts, etc. After drying, the product may be extracted with methanol if desired.

*Example 8.*—600 g. of the same reaction mass as used in the previous example and 1600–1800 cc. of commercial secondary amyl alcohols (a mixture of isomeric alcohols) are mixed in a fast, efficient agitator. The precipitate is washed several times with fresh precipitant, then with methanol and, finally, with water.

It will be understood that the examples and details of procedure hereinbefore set forth are illustrative only and in no way limit the invention described.

What I claim and desire to protect by Letters Patent is:

1. The method of recovering an aralkyl ether of cellulose from the mixture resulting from the reaction leading to its formation which includes adding to the reaction mixture an organic liquid which is solvent for organic impurities contained therein and a non-solvent for said aralkyl ether of cellulose in amount sufficient to effect precipitation of the aralkyl ether of cellulose, said organic liquid having a high "separation ratio" and a low "break-up ratio".

2. The method of recovering an aralkyl ether of cellulose from the mixture resulting from the reaction leading to its formation which includes adding to the reaction mixture an aliphatic ether which is solvent for organic impurities contained therein and a non-solvent for said aralkyl ether of cellulose in amount sufficient to effect precipitation of the aralkyl ether of cellulose.

3. The method of recovering an aralkyl ether of cellulose from the mixture resulting from the reaction leading to its formation which includes adding to the reaction mixture an aliphatic alcohol having 4 or more carbon atoms which is a solvent for organic impurities contained therein and a non-solvent for said aralkyl ether of cellulose in amount sufficient to effect precipitation of the aralkyl ether of cellulose.

4. The method of recovering an aralkyl ether of cellulose from the mixture resulting from the reaction leading to its formation which includes adding to the reaction mixture a solution comprising a liquid aliphatic hydrocarbon and an aliphatic alcohol selected from the group consisting of methanol, ethanol, propanol, and isopropanol in amount sufficient to effect precipitation of the aralkyl ether of cellulose.

5. The method of recovering benzyl cellulose from the mixture resulting from the reaction leading to its formation which includes adding to the reaction mixture an organic liquid which is solvent for organic impurities contained therein and a non-solvent for said benzyl cellulose in amount sufficient to effect precipitation of the benzyl cellulose, said organic liquid having a high "separation ratio" and a low "break-up ratio".

6. The method of recovering benzyl cellulose from the mixture resulting from the reaction leading to its formation which includes adding to the reaction mixture an aliphatic ether which is a solvent for organic impurities contained therein and a non-solvent for said benzyl cellulose in amount sufficient to effect precipitation of the benzyl cellulose.

7. The method of recovering benzyl cellulose from the mixture resulting from the reaction leading to its formation which includes adding to the reaction mixture an aliphatic alcohol having 4 or more carbon atoms which is a solvent for organic impurities contained therein and a non-solvent for said benzyl cellulose in amount sufficient to effect precipitation of the benzyl cellulose.

8. The method of recovering benzyl cellulose from the mixture resulting from the reaction leading to its formation which includes adding to the reaction mixture a solution comprising a liquid aliphatic hydrocarbon and an aliphatic alcohol selected from the group consisting of methanol, ethanol, propanol and isopropanol, in amount sufficient to effect precipitation of the benzyl cellulose.

9. The method of recovering an aralkyl ether of cellulose from the mixture resulting from the reaction leading to its formation which includes adding to the reaction mixture isopropyl ether in amount sufficient to effect precipitation of the aralkyl ether of cellulose.

10. The method of recovering an aralkyl ether of cellulose from the mixture resulting from the reaction leading to its formation which includes adding to the reaction mixture a butanol in amount sufficient to effect precipitation of the aralkyl ether of cellulose.

11. The method of recovering an aralkyl ether of cellulose from the mixture resulting from the reaction leading to its formation which includes adding to the reaction mixture a solution of ethanol and petroleum ether in amount sufficient to effect precipitation of the aralkyl ether of cellulose.

EUGENE J. LORAND.